United States Patent [19]

Skagerlund

[11] 3,720,468
[45] March 13, 1973

[54] DEVICE FOR A TRANSMITTER RECEIVER UNIT WHICH GIVES AN INDICATION WHEN AN OBJECT REFLECTS RADIATION TRANSMITTED FROM THE TRANSMITTER TO THE RECEIVER

[75] Inventor: Lars-Erik Skagerlund, Karlskoga, Sweden

[73] Assignee: Aktiebolaget Bofors, Bofors, Sweden

[22] Filed: Feb. 23, 1971

[21] Appl. No.: 118,029

[30] Foreign Application Priority Data

March 2, 1970 Sweden .................................. 2702/70

[52] U.S. Cl. .................... 356/4, 340/258 B, 343/5 PD
[51] Int. Cl. ............................ G08b 13/00, G01s 9/00
[58] Field of Search ... 356/4, 5; 340/258 B; 343/5 PD

[56] References Cited

UNITED STATES PATENTS 3,645,628   2/1972   Schenkerman ............................. 356/5
3,022,702   2/1962   Pocher ....................................... 356/5
3,503,680   3/1970   Schenkerman ............................. 356/5

FOREIGN PATENTS OR APPLICATIONS 1,500,740   9/1967   France ....................................... 356/5

*Primary Examiner*—Samuel Feinberg
*Assistant Examiner*—S. C. Buczinski
*Attorney*—Hane, Baxley & Spiecens

[57] ABSTRACT

Apparatus for indicating reflected radiation from a remote object comprises a transmitter for transmitting amplitude-modulated radiation and a receiver for receiving the amplitude-modulated radiation reflected from the remote object. The receiver includes first means for receiving the reflected radiation and converting it to first pulse signals and second means for receiving the amplitude-modulated radiation directly from the transmitter and converting it to second pulse signals. Means compare the first and second pulse signals for giving indications in accordance with the simultaneous phases of said first and second pulse signals.

7 Claims, 1 Drawing Figure

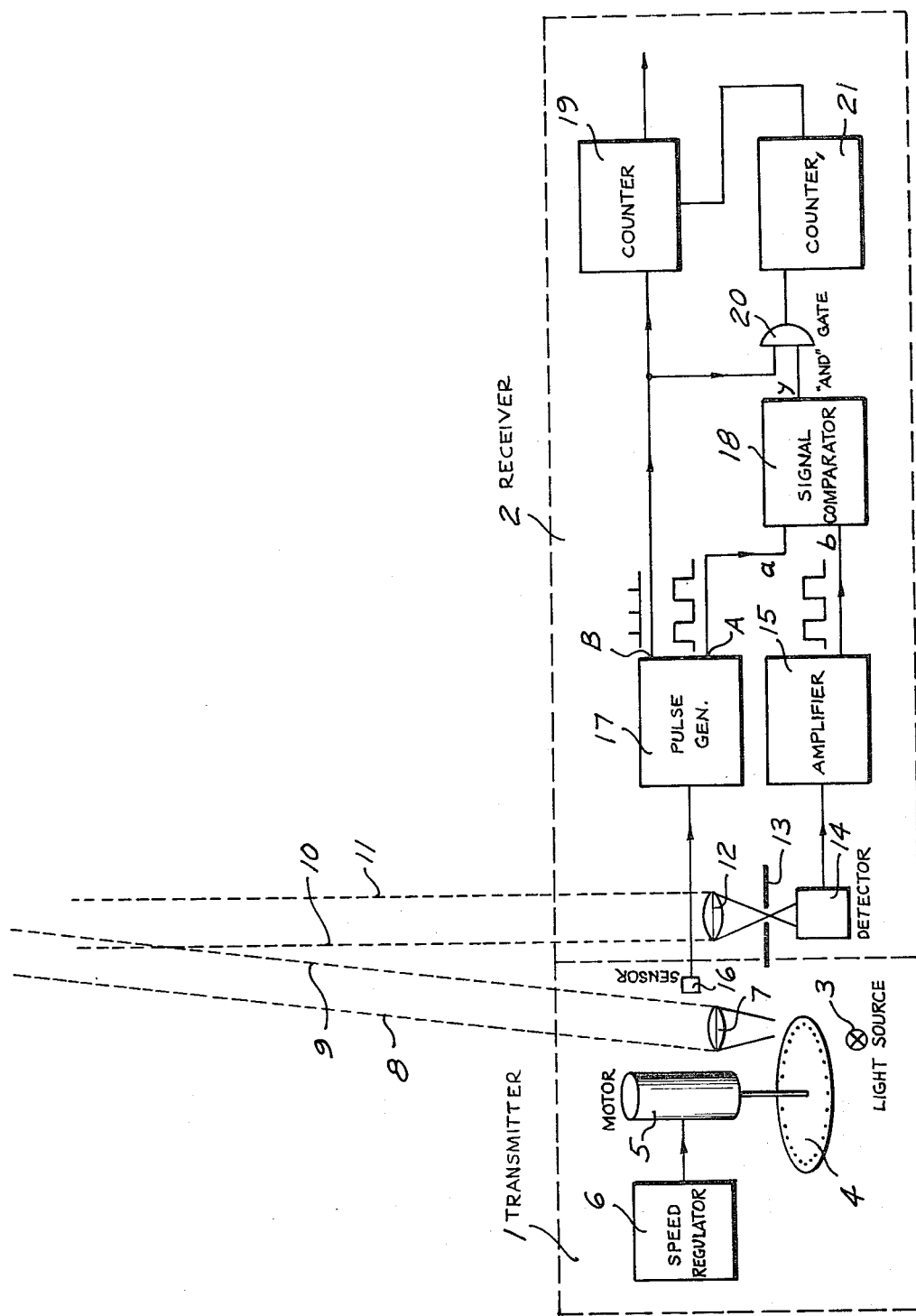

DEVICE FOR A TRANSMITTER RECEIVER UNIT WHICH GIVES AN INDICATION WHEN AN OBJECT REFLECTS RADIATION TRANSMITTED FROM THE TRANSMITTER TO THE RECEIVER

The present invention relates to a device for a transmitter-receiver unit which gives an indication when an object reflects to the receiver radiation transmitted by the transmitter wherein the transmitter radiation is amplitude modulated with a predetermined frequency and wherein the receiver includes a detecting member which forms first electric signals from received radiation signals having the predetermined frequency. By radiation is here meant primarily optical radiation with wave lengths of less than 10 μm, but the invention can be used also for electromagnetic radiation of longer wave lengths or other radiation. The radiation transmitted from the transmitter is amplitude modulated, so that it will be easier for the receiver to distinguish between the radiation signal reflected by the object and irrelevant radiation received.

In equipment of this kind it is previously known to connect the detecting member to an amplifier which, in turn, is connected to a band-pass filter which passes electrical signals having the modulation frequency. Thereafter a level sensitive circuit is connected to the filter for the purpose of eliminating disturbance signals caused by internal noise generated by the receiver. However, this arrangement requires very close frequency tolerances of the radiation transmitted by the transmitter. If, for instance, the modulation of the radiation is achieved by means of a motor driven perforated disc which chops a beam source of light, the above-mentioned arrangement requires the motor to be provided with a sophisticated speed regulator which will keep the motor running at the same speed, regardless of the influence of environmental conditions. Moreover, the band-pass filter in the proposed arrangement is very large, and its weight is comparatively high, which precludes its use in applications where low weight is an indispensable requirement. A further drawback of the band-pass filter is that the transmitter-receiver unit itself will become dependent on accurate tuning for the modulation frequency used. Further, the proposed arrangement requires that the amplitude of the reflecting radiation does not exceed the threshold value set in the limit circuit, even when occasional variations of the disturbance environment would permit a lower signal level.

An object of the invention is to provide a reflected radiation detector device which does not have the above discussed problems.

The invention contemplates a surveillance unit which includes a transmitter of radiation which is modulated at a predetermined frequency, a receiver of such radiation and a device for indicating when any of the transmitted radiation is reflected from a remote object. The device includes detector means for generating first pulses in response to received radiation and sensing means for generating second pulses in response to transmitted radiation. A pulse counter is set to a value whenever there is a pulse derived from the second pulses and is cleared to zero whenever a pulse signal comparator indicates a particular relationship exists between the first and second pulses.

Through this construction of the present device there is obtained an independence of variations in the sensitivity of the detector and the amplifier. In practice, the logic signal processing also has the advantage that it is possible, to a greater extent, to use integrated electronics, thereby achieving the desired savings in space and weight.

A device which has the properties that are significant for the invention will be described in more detail with reference to the attached drawing whose sole FIGURE shows schematically apparatus for performing the invention.

In the FIGURE there is shown within block 1 a transmitter included in a transmitter-receiver, while a receiver comprised in the same unit is indicated within block 2. The transmitter-receiver unit works with optical radiation which is obtained from a source of light 3, and the radiation transmitted from the source of light is modulated with a perforated disc 4, which is driven by a motor 5 controlled by means of a speed regulator 6, which thus determines the frequency of the radiation transmitted from the transmitter. After the modulation, the radiation is allowed to pass through optics contained in the transmitter, which in the FIGURE is symbolized with a lens 7 and emitted from the transmitter in the direction to be observed by the equipment. The radiation transmitted from the transmitter is indicated with lines 8 and 9.

If an object, not shown, is in the transmission direction, under certain circumstances the transmitted radiation 8 and 9 will be reflected by the object partly or entirely to the receiver 2, and the reflecting radiation, which is indicated with lines 10 and 11, will then enter into the optics of the receiver which is symbolized with a lens 12 and an aperture diaphragm 13, which makes it possible for a well-defined picture of the reflecting surface of the object to be applied on a known detecting member 14 in the receiver. Member 14 converts the radiation received into the corresponding first electric signals.

The detecting member 14 is also connected to an amplifying device 15 which amplifies and converts the first signals received from the member 14 into pulses adapted to the further processing. In the example of the embodiment, the amplifying device consists of a wide-band saturated amplifier, which amplifies the input signals often having varying amplitude, so that, after amplification, there is obtained square pulses with a constant amplitude. Through the use of a wide-band amplifier, it is possible to allow the frequency of the amplitude modulation of the radiation to vary, so that the motor 5 which drives the perforated disc 4 need not be provided with the same accurately performing speed regulator 6 as previously employed.

A sensing device 16, which in the example of the embodiment consists of a further detector, is included in the transmitter 1 to sense the transmitted amplitude-modulated radiation 8 and 9. The sensing device transmits second electric signals or pulses representing the transmitted radiation. The device 16, in turn, is connected to a pulse generator 17, which has two outputs, A and B. The pulse generator is then made, in a known way, so that, in dependence of the second electric signals on output A it transmits the pulses that are representative of the amplitude-modulated radiation transmitted from the transmitter, i.e., appropriate pulses which are in phase with the light pulses from the transmitter; while on output B it gives comparatively short pulses (spikes) of a double frequency in relation to the optical radiation frequency. The position of the two pulse trains in relation to each other is then such that a short pulse from output B is obtained at half of the pulse length of a pulse from output A when this is transmitting pulses which are in phase with the light pulses from the transmitter. The output of saturated amplifier 15 and output A of the pulse generator 17 are connected to a signal-comparing unit 18, which in the example of the embodiment consists of a logic unit of a known kind, in which unit the pulses initiated by the detecting member 14 will thus be compared with the pulses initiated from the detecting device. The logic unit is then arranged in such a way that it senses the momentary polarity of the pulses and gives logic zero if the signals are in phase and logic one if they are in counter phase, i.e., $$y = \bar{a}b + a\bar{b} \qquad (1)$$

Thus, the unit 18 generally does not transmit a signal when an object reflects radiation to the receiver, as the pulses initiated by the member 14 and the device 16 are then in phase. A condition for this is that the amplitude of the reflecting radiation exceeds the amplitude of noise that occurs so that the signals produced by the reflecting radiation will determine the control of the saturated amplifier 15. If a noise pulse has such amplitude and polarity it can mask the reflected pulse and unit 18 will transmit a signal.

Said equation (1) also implies that the unit 18 transmits a signal when there is no reflection, and only signals caused by noise or other disturbance occuring in the detecting member 14. The pulses from the amplifier 15 to the logic unit 18 then occur with a random polarity, and the unit 18 will therefore constantly transmit signals.

In summary, unit 18 usually transmits logical zero and an occasional logic one if detector 14 receives reflected radiation, and transmits random ones and zeros if detector 14 receives no reflected radiation.

However, there is normally a desire for having logical one continuously on the whole, if there is no reflected radiation, and logical zero predominately on the whole, if an object is detected. Therefore, further signal processing is carried out by counters 19 and 21.

The following criterion is used for determining if an object is detected: During a time interval corresponding to $n$ transmitted light pulses there must be $m$ occasions at most, when there is a logical one on the output of unit 18 ($m << n$). If this condition is not fulfilled, an object is considered not to be present.

The time interval corresponding to such $n$ transmitted pulses is measured by counter 19, that is, fed from the unit 17. At the same time, counter 21 counts the number of pulses (logical ones) from unit 18 via AND gate 20. If the number of these reaches $m$ before counter 19 has counted n transmitted pulses, counter 19 is set to zero and will have to start measuring a new time interval. If, on the other hand, counter 19 has counted to $n$ pulses before counter 21 has counted $m$ pulses, an output signal is transmitted from counter 19, indicating that there is an object in the radiation beam.

In order to avoid errors owing to minor differences in phase between the pulses initiated by the member 14 and the pulses initiated by the device 16, owing to long distances and/or time lags in the equipment, the signal transmitted by the unit 18 is allowed to pass through an AND gate 20, together with the short pulses of the double radiation frequency from output B of the pulse generator. After the AND gate has been passed, pulses are thereby obtained only when the transmitter and receiver signals have opposite polarities. Thus, in case only noise signals are obtained from the member 14, there is 50 percent probability that a pulse will be obtained from the gate.

The invention is not limited to the embodiment shown above as an example, but can be subject to modifications within the scope of the following claims. Thus, for instance, the detecting member is superfluous in cases when instead of a lamp and a perforated disc a source of light that can be directly modulated is used, e.g., a discharge tube, light diode or the like, as it is then possible to obtain the corresponding signal direct from the modulator that drives the source of light.

I claim:

1. A surveillance device for detecting the presence of a remote object by means of radiation reflected from such objects comprising transmitter means for transmitting pulses of radiation toward a remote object, means for generating reference pulses related to the transmitted pulses of radiation, means for generating information pulses related to pulses of radiation reflected from a remote object and possible noise signals, and means for receiving the reference pulses and the information pulses to give an indication of the presence of a remote object only when a particular polarity relationship exists between a reference pulse and an information pulse.

2. In a surveillance device which includes a transmitter for transmitting radiation modulated at a predetermined frequency and which includes a detector which generates first electric signals in response to received radiation, a device for giving an indication when a remote object reflects to the receiver radiation transmitted by the transmitter comprising sensing means for generating second electric signals related to the transmitted radiation, amplifier means connected to the detector for converting the first electric signals to first pulses, pulse generator means connected to said sensing means for generating second and third pulses related to said second electric signals, a pulse signal comparator means connected to said pulse generator means and said amplifier means for comparing the polarities of the first and second pulses to give an indication pulse when a particular polarity relationship exists, and at least one pulse counter connected to said pulse generator and said pulse comparator means which is set to a count value upon receipt of a third pulse at a first input from said pulse comparator means and is cleared to zero upon receipt of an indication pulse at a second input from said pulse comparator means.

3. The device according to claim 2 wherein said amplifier means is a saturated wide-band amplifier.

4. The device according to claim 2 further comprising another pulse counter connected between said pulse comparator means and the second input of said one pulse counter.

5. The device according to claim 3 wherein said amplifier means is a saturated wide-band amplifier.

6. The device according to claim 2 further comprising an AND-circuit having inputs connected to said pulse generator means and said pulse signal comparator means and an output connected to the second input of said one pulse counter.

7. The device according to claim 6 wherein the pulse signal comparator means is an exclusive-or logic circuit.

* * * * *